Dec. 1, 1931.  R. L. FELLMANN ET AL  1,834,773
HYDRAULIC CONTROL DEVICE
Filed June 16, 1928
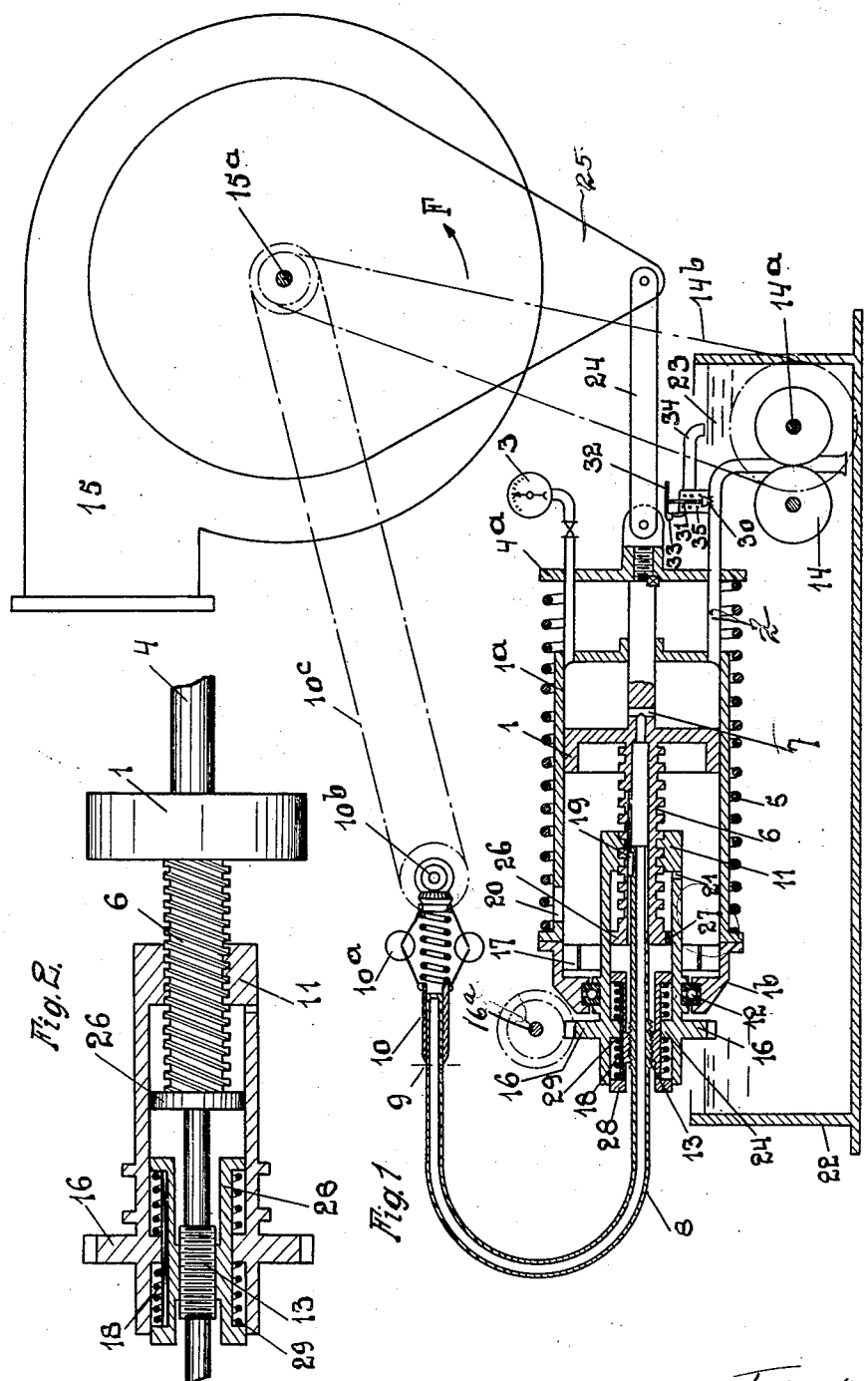
Inventors:—
Robert Leon Fellman
and Marie Camille George
by [signature]
Atty.

Patented Dec. 1, 1931

1,834,773

UNITED STATES PATENT OFFICE

ROBERT LEON FELLMANN AND MARIE CAMILLE GEORGE, OF GOLBEY, NEAR EPINAL, FRANCE

HYDRAULIC CONTROL DEVICE

Application filed June 16, 1928, Serial No. 286,016, and in Germany June 28, 1927.

This invention relates to servo-motor regulators controlled by a centrifugal governor. It is known to provide these regulators with an oil brake which prevents the oscillations for a long period. Such regulators ensure the return to normal speed when the servo-motor has effected the regulation under the control of the centrifugal governor. However, in the best of cases, it is necessary to slightly vary the speed more or less in a certain degree when the load of the engine to be regulated becomes greater or vice versa.

For this purpose, when there is a reduction or an increase of the load, the sleeve of the centrifugal governor and the distributor of the servo-motor must be left, after regulation, in the same reciprocal position as before the variation of the load. These elements must undergo a relative constant movement corresponding to the admissible increase or reduction of speed.

According to the present invention, this result is obtained in the following manner:

A delivery tube, the orifice of which is controlled by the sleeve of the centrifugal governor, slides in the hollow piston rod of the servo-motor. This tube and the hollow piston rod are interconnected by means of a differential nut. The part of this nut corresponding to the sliding tube is in the form of a socket which slides to the interior of the other part of the nut between springs and which is subjected to the action of a dashpot, the piston of which is carried by the hollow piston rod of the servo-motor.

The differential nut may be arranged so as to be conveniently set in rotation by hand for starting en route.

The accompanying drawings show a constructional form of the device constituting the subject matter of the invention.

Figure 1 represents diagrammatically a constructional form of the subject matter of the invention adapted for regulating a hydraulic turbine.

Figure 2 represents a detail of Fig. 1 in an external view instead of a section.

The main piston 1 moving in the cylinder 1a is subjected on one of its faces to the action of oil under pressure which is admitted to the cylinder through the tube 2 and the pressure of which may be determined by means of a pressure gauge 3.

The pressure of oil is produced by a pump having gear 14, and taking the liquid into the frame 22. The shaft 14a of the pump may be controlled by means of a belt 14b through the shaft 15a of the turbine 15 to be regulated. On the face receiving the pressure the piston 1 carries a rod 4 extending through the head of the cylinder 1a. The said rod is connected by a connecting rod 24 to the slide valve 25 of the turbine 15 to be regulated. On the opposite face, the piston 1 communicates with the atmosphere through an orifice 20 formed in the wall of the cylinder 1a.

The rod 4 carries a plate 4a against which bears a spring 5 surrounding the cylinder 1a. This spring is of sufficient strength to effect the closure of the turbine 15 when the oil pressure has to be rendered ineffective.

On its face in communication with the atmosphere, the piston 1 carries a tubular rod 6, the central passage of which communicates through transverse channels 7 with the part of the cylinder receiving the oil. Within the hollow rod 6 telescopes a tube 8 connected to the said rod by a keying 19 preventing the tube 8 from rotating and restraining the same to a rectilinear movement relative to the axis of the rod 6. The tube 8 is bent and its extremity communicates with the exterior through small orifices 9 allowing the oil coming from the pump to escape and to return to the frame 22. The extent of the opening of the orifices 9 is adjusted by the pilot socket 10 which is rotated together with governor 10a but undergoes rectilinear displacements of slight amplitude on the tube 8 by the action or effect of the control of said centrifugal governor 10a actuated through the medium of shaft 10b and belt 10c by the main shaft 15a of the turbine 15 to be regulated.

The rod 6 is externally threaded at a high pitch, as is indicated in Fig. 2 in an external view, these threads engaging with the internal threads of a sleeve 11 adapted to rotate but immobilized in the longitudinal direction by a ball-bearing stop 12 placed in the cover 1b of the cylinder 1a and arranged in such manner that it can undergo pressure in both directions, the sleeve 11 having shoulders where it projects from the cover 1b.

The end of the hollow rod 6 of the piston 1 forms a small piston 26 which moves in the bore of the sleeve 11, the interior of the sleeve 11 being always filled with oil without pressure. The piston 26 has a small orifice 27 while the sleeve 11 communicates with the left part of the cylinder 1a where there is no pressure through the small orifice 21. The whole forms an oil brake or dashpot.

There is also provided in the bore of the sleeve 11 a socket 28 likewise constituting a piston.

The socket 28 may have a larger diameter than the piston 26 so that their strokes are different when the piston 26 acts either by pressure or by vacuum on the socket 28.

This socket 28 is screwed on the tube 8 by a thread with a fine pitch 13. The piston-socket 28 carries a long key 18 while the sleeve 11 has a groove at 24 so that the socket 28 is entrained by the rotation of the sleeve 11 wherein it is adapted to slide. On each side of the grooved shoulder 24 of the sleeve 11 there are two compression springs 29 which always tend to restore the piston-socket 28 to an invariable mean position.

A toothed wheel 16 is mounted on the sleeve 11. This wheel is controlled by a worm 16a. The worm may be disengaged from the wheel by means not shown in the drawings. When the worm is engaged by its wheel, it is possible to operate by hand the valve 25 of the turbine 15 through the medium of the sleeve 11, screw 6, rod 4 and the connecting rod 24.

When worm 16a is disengaged, the operation of the valve is automatic as will be explained later. The mechanism with the worm serves only for starting because it is sufficient, in order to stop the turbine, to produce a drop of the oil pressure by lifting the valve 30, the spring 5 ensuring the closure of the valve 25.

Said valve 30 is mounted on a stem 31 jointed to a handle 32 articulated at 33. When valve 30 is lifted from its seat through handle 32, a certain quantity of oil is allowed to flow back through pipe 34 to tank 22.

When the valve 30 is not lifted by its handle 32, it is subjected to the action of a compression spring 34 and constitutes a safety valve for the pump 14. A spiral coiled spring 17 attached on the one hand to the sleeve 11 and on the other hand to the cover 1b constantly maintains the same faces of the threads of screw 6 and of the internal threads of sleeve 11 in engagement with each other, thereby automatically preventing play between said threads, which play would affect the precision of the operation. It is to be understood that the action of this spring is comparatively negligible with regard to the longitudinal forces of the spring 5 and the oil pressure which ensure the operation of the valve 25.

The device just described operates as follows:

The turbine is started by moving the screw 16a by hand, which is then disengaged as stated above.

The apparatus being suitably regulated, the equilibrium established between the driving force and the resisting force for a given speed and the operation is automatic.

It is assumed that no variation of the load is produced and that the speed remains constant. The oil pressure produced by the pump 14 acts on the right face of the piston 1 for equilibrating the force arising from the mechanical resistance of the valve 25 and that of the compression spring 5 which tends to close it. The oil under pressure passes through the openings 7, then through the telescopic tube 8 and is finally discharged through the orifices 9 partially stopped by the sleeve 10 of the centrifugal governor 10a. The oil is finally discharged at a speed which depends on its pressure in order to drop again into the frame 22 forming a container where it will be recovered indefinitely by the pump 14. The mechanical resistance of the valve 25 from the opening to the closure as well as that of the antagonistic spring 5 vary for each position; consequently, the value of the oil pressure varies from the opening to the closure. However, the position of the valve in consequence of the mechanism, the operation of which will be described later, is not dependent on the conditions of force and pressure but on the position of the pilot socket 10 of the centrifugal governor 10a.

When the pilot socket 10 of the centrifugal governor 10a is displaced to the right under the influence of an increase of speed consequent to a decrease of load of the turbine 15, it will open the outlets 9 of the tube 8 to a greater extent. The oil pressure decreases on the right face of the piston 1 and the compression spring 5 displaces to the right all the movable parts: piston, connecting rod, and regulating ring 25.

The piston 26 also moves to the right and creates a vacuum in the bore of the sleeve 11 filled with oil; the socket piston 28 and the tube 8 being entrained to the right. The tube 8 thus follows the same movement as the pilot socket 10 so that when the speed ceases to increase and the socket 10 ceases to be displaced, the oil outlets are again obstructed relative to the pressure on the piston 1 for maintaining the equilibrium of the spring 5 and the valve 25. At this moment, the consequent regulation relative to the variation of load had been effected; as has been proved by calculation and tests, this is the moment when the speed of the turbine to be regulated exceeds a maximum.

From this point, the speed begins to decrease slowly, the oscillating masses of 10a draw near while the pilot socket 10 is displaced slowly to the left. If this displacement should have an effect on the movement of the valve which has its definite position, there would result therefrom oscillations of a longer or shorter period which only slowly establish the equilibrium. However, the socket piston 28 is also brought back to the left under the action of the springs 29 at the same time as the socket 10 moves to the left. The orifice 9 and the socket 10 maintain their respective positions and the speed is restored to normal without the position of the piston 1 and that of the valve 25 being varied with regard to the regulation. If the speed has undergone a decrease instead of an increase, the same movements will be produced in the opposite direction.

If the operation of the apparatus should terminate there, the speed would be the same after the variation from normal. This fact is inadmissible in the majority of the cases especially when it is a question of electric generating sets coupled in parallel.

It is necessary to make the final speed slightly different after the variation from normal so that each position of the valve corresponds to a different position of the centrifugal governor in a zone which is greatly reduced in consequence of the displacement.

In order to obtain this result, a part 13 of the tube 8 is threaded with a fine pitch as shown in Fig. 2; the sleeve 11 being set in rotation by the screw 6, also rotates the socket piston 28 owing to the keying 18 on the piston. The rotation of the piston 28 causes a certain displacement of the tube 8 in the desired direction so that a definite position of the tube 8 corresponds to each position of the piston 1 and the valve 25. The displacement of tube 8 is very slight relative to that of piston 1 owing to the difference of the pitches of the threads 6 and 13. Consequently, the orifice 9 has a slightly different position each time a regulation has been effected, i. e., the tube 8 and the openings 9 do not return exactly to their starting point after the variation which necessitates for the new regulation a slightly different speed according to the loads of the turbine. This is what is termed a certain degree of statism.

It is understood that the device constituting the subject matter of the invention may be applied not only to a hydraulic turbine as described but to any other driving engine.

Having described our invention what we claim as new and desire to secure by Letters Patent is—

1. A control apparatus of the type described comprising in combination a cylinder (1a), a piston (1) in said cylinder, an inlet for fluid pressure on one face of said piston, a spring (5) adapted to oppose the action of the fluid on this piston, a hollow rod (6) on the other face of said piston communicating with the first face, a sliding tube (8) keyed at the interior of the hollow rod, a discharge opening in said tube, a closure member (10) actuated by a centrifugal governor to control the discharge opening (9) of said sliding tube, a threading on said hollow piston rod, a finer threading on the sliding tube, a rotatable sleeve carried by the cylinder and having a threading engaging with that of the hollow piston rod, and an enlarged portion (26) at the end of this rod sliding at the interior of said sleeve, a narrow passage (27) in said enlarged portion, a threaded sleeve (28) engaging with the threading of the sliding tube keyed in the rotating sleeve and adapted to slide in this sleeve, and springs acting in the opposite direction on said sleeve.

2. A control apparatus of the type described comprising in combination a cylinder (1a), a piston (1) in said cylinder, an inlet for fluid pressure on one face of said piston, a spring (5) adapted to oppose the action of the fluid on this piston, a hollow rod (6) on the other face of said piston communicating with the first face, a sliding tube (8) keyed at the interior of the hollow rod, a discharge opening in said tube, a closure member (10) actuated by a centrifugal governor to control the discharge opening (9) of said sliding tube, a threading on said hollow piston rod, a finer threading on the sliding tube, a rotatable sleeve carried by the cylinder and having a threading engaging with that of the hollow piston rod, and an enlarged portion (26) at the end of this rod sliding at the interior of said sleeve, a narrow passage (27) in said enlarged portion, a threaded sleeve (28) engaging with the threading of the sliding tube, keyed in the rotatable sleeve, adapted to slide in this sleeve, springs acting in the opposite direction on said sleeve and means (16) to rotate said sleeve manually.

In testimony whereof we hereunto affix our signatures.

ROBERT L. FELLMANN.
MARIE C. GEORGE.